United States Patent
Tyckowski

(10) Patent No.: US 6,359,402 B1
(45) Date of Patent: Mar. 19, 2002

(54) METHOD AND SYSTEM FOR DETERMINING MOVEMENT OF A MOTOR IN A VEHICLE POWER WINDOW SYSTEM

(75) Inventor: Joseph Tyckowski, Clawson, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 21 days.

(21) Appl. No.: 09/596,262

(22) Filed: Jun. 16, 2000

(51) Int. Cl.$^7$ ................................................ E05F 15/16
(52) U.S. Cl. ........................ 318/286; 318/608; 388/911
(58) Field of Search ................................ 318/244, 245, 318/280, 283, 286, 466–469, 606, 607, 608; 388/911

(56) References Cited

U.S. PATENT DOCUMENTS 5,598,000 A * 1/1997 Popat ......................... 250/206
6,172,473 B1 * 1/2001 Oka et al. ................... 318/244

OTHER PUBLICATIONS

Richard Dorf and Robert Bishop: "Modern control Systems", Eighth Edition, Addison–Wesley Publishing, 1998, p. 328.*

Rudolf Graf: "Modern Dictionary of Electronics", Sixth Edition, SAMS Publishing, 1992, p. 730.*

* cited by examiner

Primary Examiner—Bentsu Ro
(74) Attorney, Agent, or Firm—Carlson, Gaskey & Olds

(57) ABSTRACT

A method and system for detecting a change in the position of an electric drive motor in a vehicle power window system includes a current sensor for sensing a current of the motor, and generating an input signal having a phase associated therewith. A signal generator generates a reference signal having a predetermined phase and a frequency. A comparator is in communication with the current sensor and the signal generator for comparing the phase of the input signal with the phase of the reference signal. A control circuit, in communication with the signal generator, determines movement of motor based on the comparison. If the motor does not move while being commanded to close, an obstruction may be assumed to be present between the window and its respective frame.

18 Claims, 2 Drawing Sheets

Fig-2

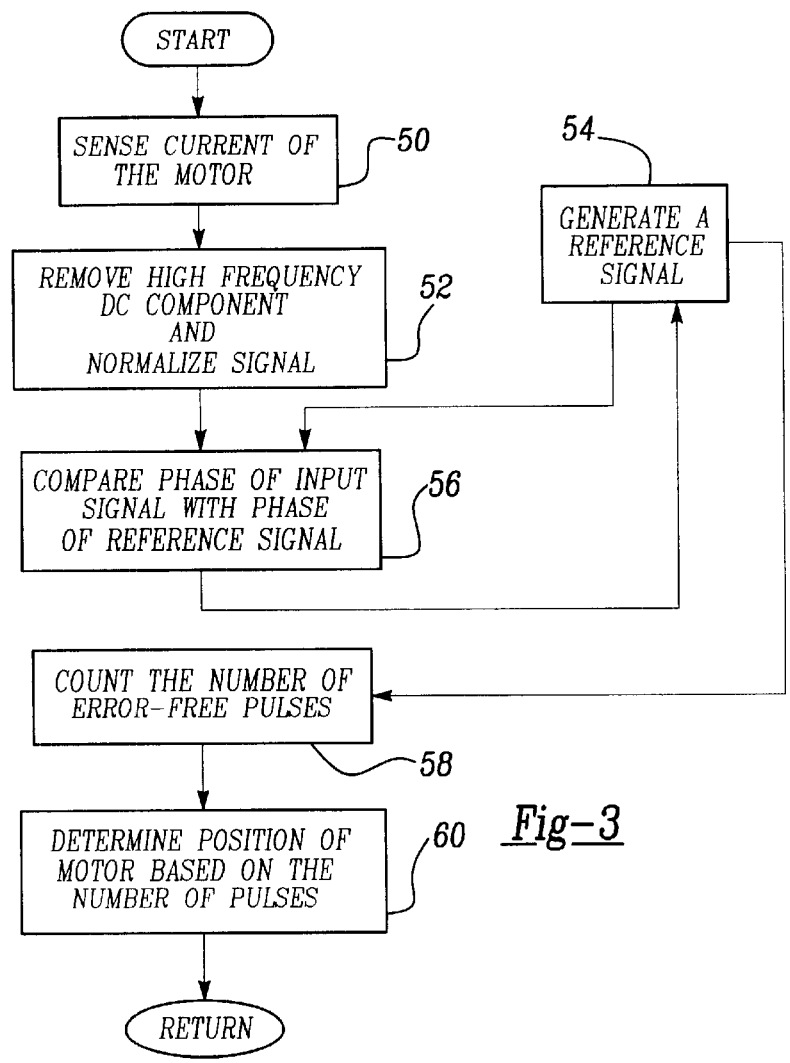
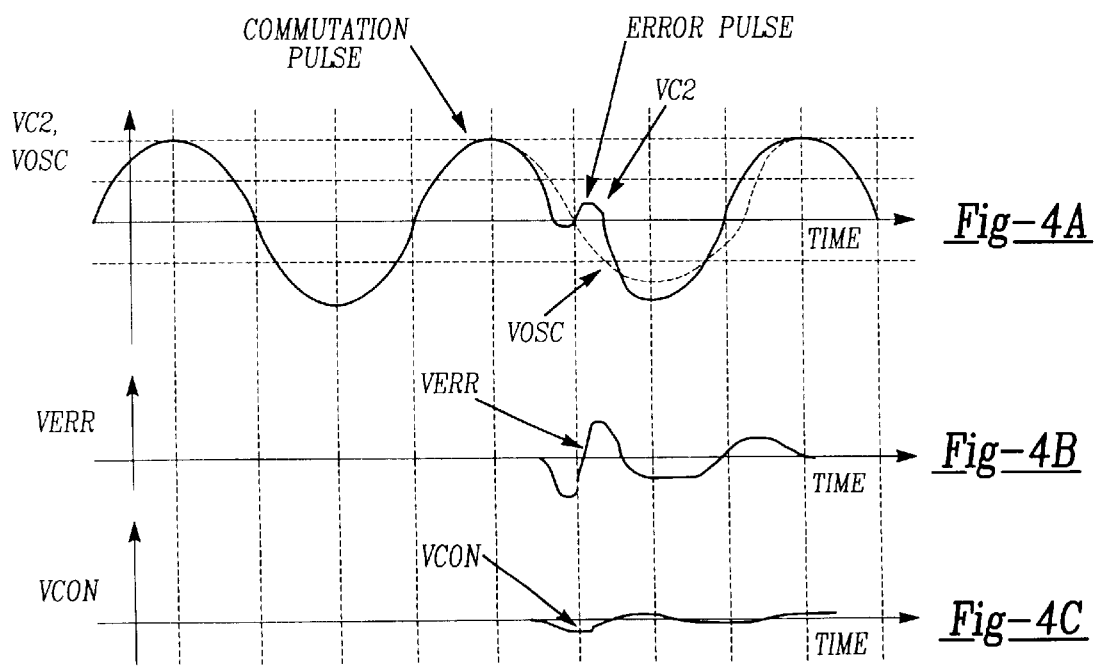

METHOD AND SYSTEM FOR DETERMINING MOVEMENT OF A MOTOR IN A VEHICLE POWER WINDOW SYSTEM

BACKGROUND OF THE INVENTION

The invention relates to a method and system for determining movement of a motor in a vehicle power window system for detecting an object caught between the window and its respective frame.

Many vehicles today have electronically controlled windows and electronically controlled sun/moon roofs. These systems provide the operator with ease in opening and closing the windows. However, if the operator is distracted while closing the window, it is possible for an object, such as an arm, hand or finger, to be caught between the window and the window frame of the automotive window.

Power window systems typically include a regulator attached to the window for opening and closing the window and driven by an electric drive motor. The motor current wave form of these windows has a distinct sinusoidal component caused by the commutation process. Each commutation pulse can be related to angular rotation of the motor armature. Thus, window position can be determined by counting the commutation pulses. However, a problem arises due to random error pulses mixed in with the commutation pulses thereby introducing error into the position count. The error pulses cannot be filtered out using conventional band pass filter techniques because the magnitude and frequency of these error pulses are within the frequency range of the commutation pulses.

Thus, there exists a need for accurately determining movement of the motor via a change in the position of the motor for determining the presence of an object caught between a power window and its respective frame.

SUMMARY OF THE INVENTION

A method and system is disclosed for determining movement of a motor in a vehicle power window system. A current sensor senses a current of the motor and generates an input signal having a phase associated therewith. A signal generator generates a voltage controlled reference signal having a predetermined phase and a frequency associated therewith. A comparator is in communication with the current sensor and the signal generator for comparing the phase of the input signal with the phase of the reference signal. A control circuit, in communication with the signal generator, determines whether there is any movement of the motor based on the comparison.

The comparator determines a difference between the phase of the input signal and the phase of the reference signal and passes this difference to the signal generator, which then adjusts the frequency of the reference signal based on this difference. A second comparator converts the adjusted reference signal into a digital signal having pulses so that the control circuit can count the number of pulses in the adjusted reference signal to determine the position of the motor. The control circuit also determines whether the position is changing. If the position does not change, this may be indicative of an obstruction.

A motor drive circuit that controls the power window system is controlled to either stop or reverse the direction of the motor if the position of the motor has not changed and is constant.

These and other features of the present invention can be understood from the following specification and drawings.

BRIEF DESCRIPTION OF THE DRAWINGS

FIG. 3 is a flow diagram illustrating the general steps associated with the method of the present invention; and FIGS. 4a–4c are graphs illustrating the operation of the system of the present invention.

DETAILED DESCRIPTION OF A PREFERRED EMBODIMENT

Figure 1:
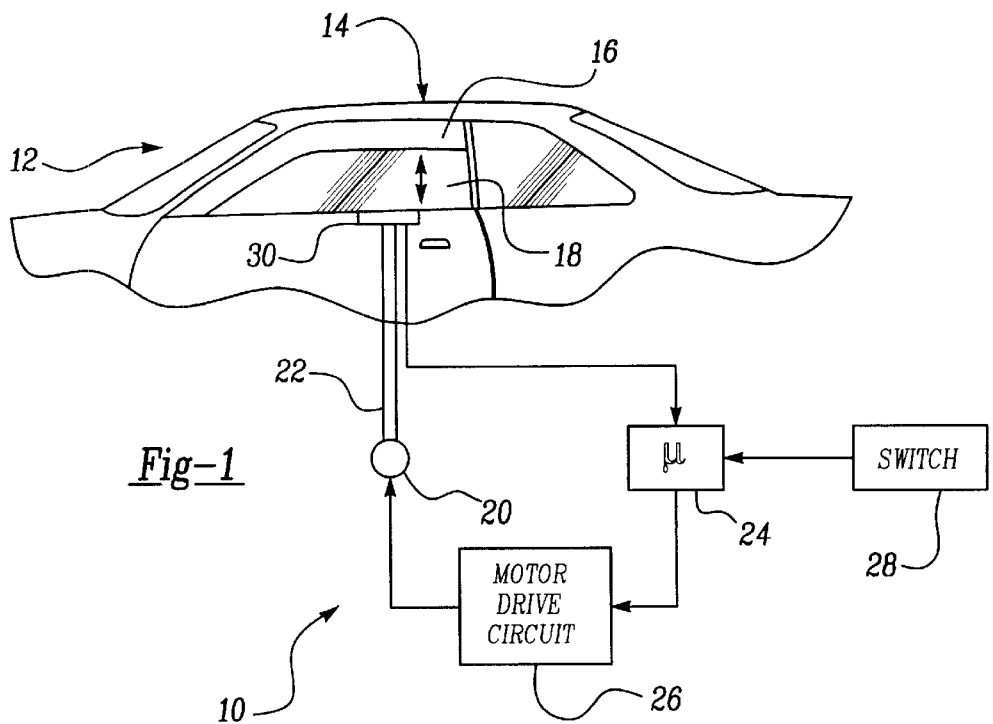
FIG. 1 is a schematic block diagram of a power window system incorporating the object detection method of the present invention.

FIG. 1 shows a power window system 10 incorporating the object detection method of the present invention. A vehicle has a door 12 and a window frame 14 defining a window opening 16. While a side window is shown, the term "window" as used in this application also extends to rear windows, moon roofs, sun roofs, or other vehicle closure components.

The door 12 is equipped with a window glass 18 movable elevationally within the window opening 16 and a drive motor 20 linked with a regulator 22 for driving the window glass 18 upward and downward. Microprocessor, or control circuit, 24 controls the drive motor 20 via motor drive circuit 26 in response to signals from switch 28 that commands upward/downward movement of the window glass 18.

Figure 2:
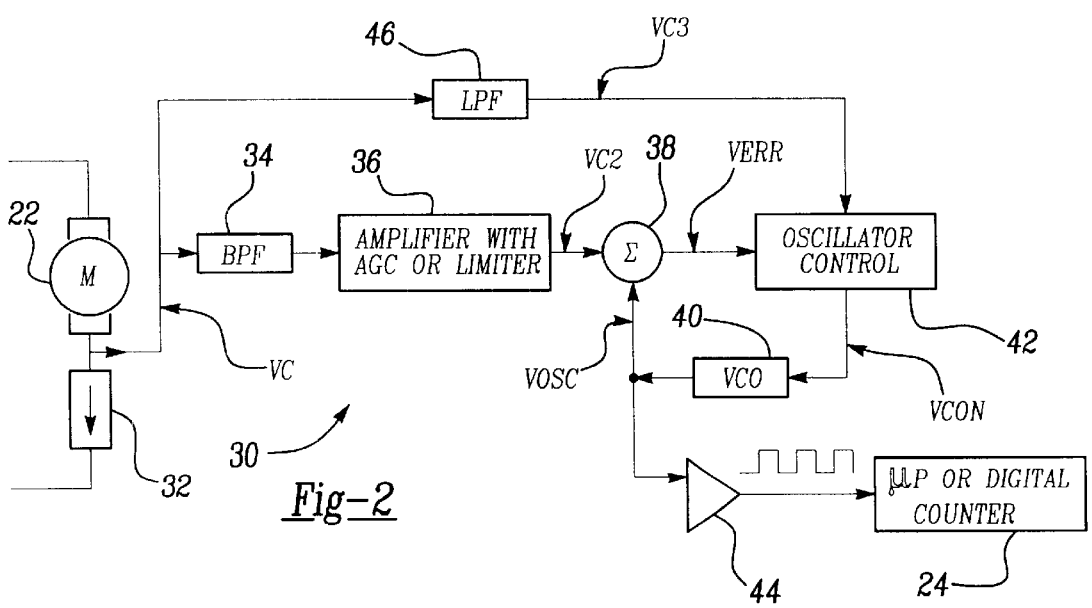
FIG. 2 is a block diagram of the system of the present invention.

FIG. 2 shows a block diagram of the system of the present invention, denoted generally by reference numeral 30. Motor current 22 is sensed by an appropriate sensing device 32 generating a representative voltage signal, $V_c$. This voltage signal is passed through a Band Pass Filter (BPF) 34 to remove high frequency and DC components. The signal is next passed through an amplifier 36 having Automatic Gain Control (AGC) or a limiter in order to normalize the amplitude.

The resulting commutation signal, $V_{c2}$, is summed via a summer 38 with the output signal of a Voltage Controlled Oscillator (VCO) 40, $V_{osc}$. The resulting error signal, $V_{err}$, is input to an oscillator control circuit 42 that is used to create the control signal, $V_{con}$, for the VCO 40. The output of the VCO 40 is also transmitted to a comparator 44 for conversion into a digital signal that is read by a position tracking circuit, or control circuit 24.

A quasi steady state current signal, $V_{c3}$, can also be input to the control circuit as a supplemental or alternative control signal. This signal is taken from the output of a Low Pass Filter (LPF) 46 coupled to the output of the current sensing device 32. This component of the current is related to speed in a dc motor and therefore also related to frequency of commutation.

Operation of the method of the present invention will be described in conjunction with the flow diagram shown in FIG. 3 and the graphs shown in FIGS. 4a–4c. At block 50, the current of the motor 22 is sensed via current sensor 32. High frequency DC pulses are extracted from the motor current signal, the signal is normalized at block 52, via the BPF 34 and amplifier 36 to generate input signal $V_{c2}$, as shown in FIG. 4a.

At the same time, the reference signal, $V_{osc}$, is generated, block 54, having a known phase. The summer 38, VCO 40 and oscillator control circuit 42 try to maintain constant phase between the input signal, $V_{c2}$, and the reference signal, $V_{osc}$. The devices achieve this by creating an error signal from the difference between $V_{c2}$ and $V_{osc}$, block 56, and using this error signal to adjust the frequency of the VCO 40. As the phase between $V_{c2}$ and $V_{osc}$ change, as shown in FIG. 4a, the error signal increases or decreases accordingly, as shown in FIG. 4b. As a consequence, the frequency of the VCO 40 increases or decreases to minimize the error between $V_{c2}$ and $V_{osc}$, thereby locking in the phase between $V_{c2}$ and $V_{osc}$, as shown in FIG. 4c.

Next, the adjusted reference signal, $V_{osc}$, is passed through a comparator 44 so that a pulse signal is generated. At block 58, the pulses are counted by microprocessor 24, wherein error pulses are ignored. Finally, at block 60, the position of the motor 22 is accurately determined based on the number of pulses counted by microprocessor 24.

In this application, the VCO control signal does not change instantaneously. It can only change at a rate limited by the oscillator control circuit 42. As a result, when an error pulse occurs, the VCO 40 is too slow to respond, thus ignoring the pulse. The oscillator control circuit 42, however, allows the VCO 40 to change with the normal speed change of the motor 22 because the oscillator control circuit 42 mimics the dynamics of the system driven by the motor 22.

Once an error-free position of the motor 22 is determined, the presence of an object caught in the path of the power window 18 can be inferred. If the motor position is consistently changing in response to a command to close window, then there is no obstruction inhibiting rotation of the motor 22. However, if an object is caught between the window 18 and its frame 14, then the position of the motor 22 does not change since the object is inhibiting rotation of the motor 22.

Preferred embodiments have been disclosed. However, a worker skilled in this art would recognize that modifications would come within the scope of this invention. Thus, the following claims should be studied to determine the scope and content of this invention.

What is claimed is:

1. A method for detecting a change in position of an electric drive motor in a vehicle power window system, the method comprising:

sensing a current of the motor, the current generating an input signal having a phase associated therewith;

generating a reference signal having a predetermined phase and a frequency associated therewith;

comparing the phase of the input signal with the phase of the reference signal, and determining a difference between the phase of the input signal and the phase of the reference signal, and adjusting the frequency of the reference signal base on the difference; and determining movement of the motor based on the reference signal.

2. The method as recited in claim 1 wherein determining movement of the motor comprises:

converting the adjusted reference signal into a digital signal having pulses; and counting the number of pulses in the adjusted reference signal to determine motor position.

3. The method as recited in claim 2 further comprising controlling the power window system based on motor movement.

4. The method as recited in claim 3 wherein determining the position of the motor includes determining the position of the motor as being constant and wherein controlling the power window system includes stopping the motor.

5. The method as recited in claim 3 wherein determining the position of the motor includes determining the position of the motor as being constant and wherein controlling the power window system includes reversing the motor.

6. The method as recited in claim 1 wherein sensing the current of the motor comprises filtering high frequency and DC components from the input signal.

7. The method as recited in claim 6 wherein sensing the current of the motor further comprises normalizing the input signal.

8. The method as recited in claim 1 wherein sensing the current of the motor comprises generating a low frequency component of the input signal having a frequency associated therewith and wherein comparing the phase of the input signal with the phase of the reference signal comprises adjusting the frequency of the reference signal to correspond to the frequency of the low frequency component of the input signal.

9. A system for detecting a change in the position of an electric drive motor in a vehicle power window system, the system comprising:

a current sensor for sensing a current of the motor, the current generating an input signal having a phase associated therewith;

a signal generator for generating a reference signal having a predetermined phase and a frequency associated therewith;

a first comparator, in communication with the current sensor and the signal generator, for comparing the phase of the input signal with the phase of the reference signal, said comparator being further operative to determine a difference between the phase of said input signal and the phase of said reference signal and being further operative to adjust the frequency of said reference signal based on a determined difference; and a control circuit, in communication with the signal generator, for determining motor movement based on the comparison on the reference signal.

10. The system as recited in claim 9 further comprising a second comparator for converting the adjusted reference signal into a digital signal having pulses and wherein the control circuit, in determining movement of the motor, is further operative to count the number of pulses in the adjusted reference signal to determine motor position.

11. The system as recited in claim 10 further comprising a motor drive circuit for controlling the power window system based on motor movement.

12. The system as recited in claim 11 wherein the control circuit, in determining motor movement, is further operative to determine the position of the motor as being constant and wherein the motor drive circuit, in controlling the power window system, is further operative to stop the motor.

13. The system as recited in claim 11 wherein the control circuit, in determining motor movement, is further operative to determine the position of the motor as being constant and wherein the motor drive circuit, in controlling the power window system, is further operative to reverse the motor.

14. The system as recited in claim 9 further comprising a first filter for filtering high frequency and DC components from the input signal.

15. The system as recited in claim 14 wherein the first filter is a band pass filter.

16. The system as recited in claim 14 further comprising an amplifier for normalizing the input signal.

17. The system as recited in claim 9 further comprising a second filter for generating a low frequency component of the input signal having a frequency associated therewith and wherein the signal generator is further operative to adjust the frequency of the reference signal to correspond to the frequency of the low frequency component of the input signal.

18. The system as recited in claim 17 wherein the second filter is a low pass filter.

* * * * *